July 1, 1958    P. F. HAYNER ET AL    2,841,016
GYROSCOPE
Filed Nov. 12, 1953
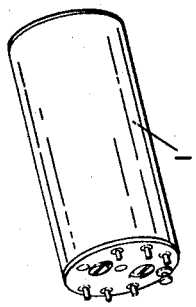
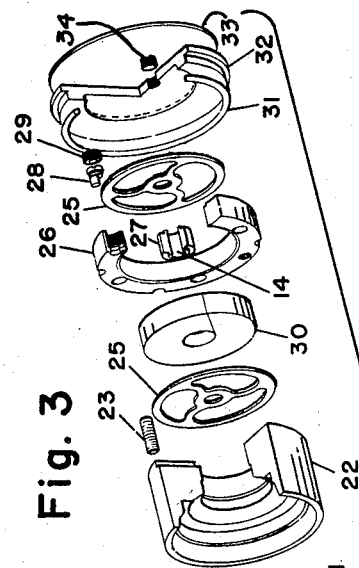
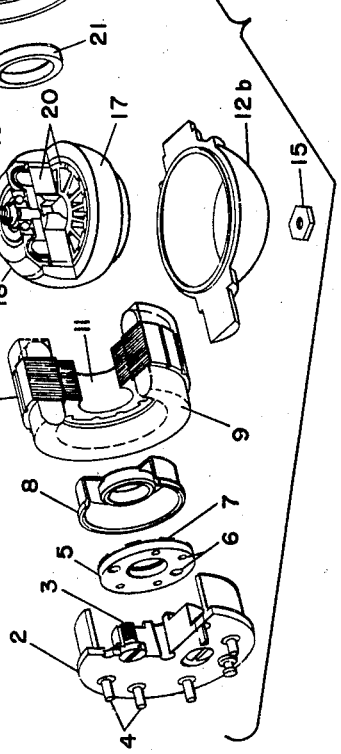
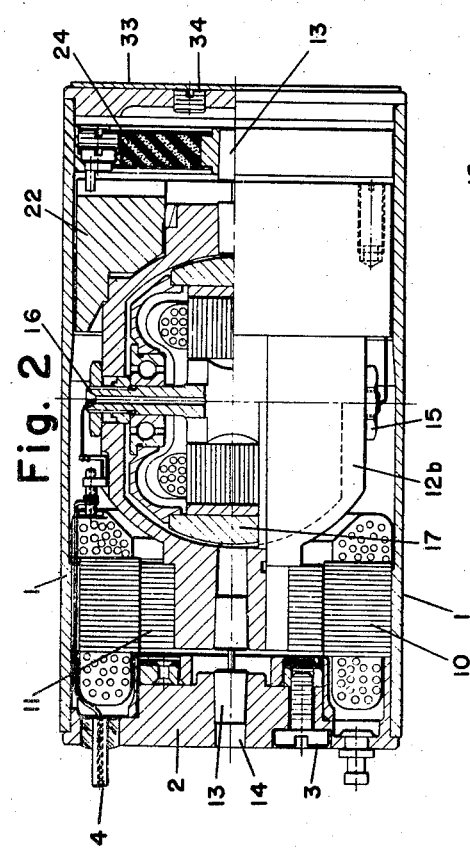
Paul F. Hayner
George J. Shomphe    INVENTORS
Attorney

United States Patent Office 2,841,016
Patented July 1, 1958

2,841,016

GYROSCOPE

Paul F. Hayner, Pelham, and George J. Shomphe, Nashua, N. H., assignors, by mesne assignments, to Sanders Associates, Inc., Nashua, N. H., a corporation of Delaware Application November 12, 1953, Serial No. 391,494

10 Claims. (Cl. 74—5.6)

This invention relates generally to gyroscopes and, more particularly to rate gyros of the type employed in modern aircraft, guided missiles and the like. It is particularly directed to the provision of a rate gyro which is of exceedingly small size while, at the same time having an improved performance relative to similar instruments of larger size.

In reducing the size of the gyro while improving its performance, consideration must be given to various factors including the undesirable torques introduced by the gyro gimbal mounting system and the pick-off method. It has been a requirement to reduce such torques to an absolute minimum. More particularly, the accuracy of performance achieved by conventional rate gyros has had limitations imposed thereon by the presence of undesirable torques due to friction of the gimbal mounting arrangement. Recent designs of rate gyros have usually been based upon obtaining inherently low friction bearings to support the output axis. Such efforts have been followed to the extent that appreciable additional improvement in this manner can no longer be expected. Furthermore, due to manufacturing problems, it has been difficult to obtain such low friction bearings in the large quantities required and at a reasonably low cost.

It is, therefore, a fundamental object of the present invention to provide a gyro of as small size as is possible while not sacrificing but rather improving the performance of the instrument itself.

More specifically, it is an object of the invention to provide an improved supporting and motion translating means for movable elements of a gyro.

For a better understanding of the present invention, together with other and further objects thereof, reference is made to the following description taken in connection with the accompanying drawing and its scope will be pointed out in the appended claims.

In accordance with the present invention there is provided a new and improved gyroscope comprising a rotor and a gimbal having a bearing means for the rotor coincident with the axis of spin of the rotor. A suspension for the gimbal is also provided having a fixed support and a pair of torsion bars each having an elastic central portion and enlarged ned portions which are secured to the fixed support and to the gimbal along a line perpendicular to the spin axis of the rotor. The torsion bars support the gimbal while providing for pivotal movement of the gimbal about the aforementioned perpendicular line without friction.

In accordance with the present invention there is also provided a torsion bar for a gyroscope comprising an integral member having a relatively narrow central portion and at least one enlarged end portion.

In accordance with the present invention all moving bearings are entirely eliminated from the gyro gimbal suspension. The support and the centering of the gimbal are accomplished by means of the improved supporting elements of the present invention. These elements include torsion bars of special design and construction, and are made of a low hysteresis, high stress endurance material such as beryllium copper. The torsion bars have relatively narrow elastic central portions and enlarged tapered end portions which are carried by correspondingly shaped supports. The bars not only provide the required supporting means, but also a restraining torque which resists the motion of the gimbal about the output axis. Friction is substantially eliminated from the output shaft suspension.

The building of rigidity into the gimbal is a most important characteristic in the design of gyros of this type. Adequate rigidity is achieved in the present gyroscope with a minimum over-all increase in size and in inertia about the output axis, by the employment of a spherical shell gimbal design which surrounds the rotor, and minimizes the effects of resonant frequencies and distortions at the supporting points. While this particular feature of the invention in itself forms a part of another copending application, the cooperating structure of such a gimbal and the torsion bars described herein are utilized in maintaining gimbal rigidity.

By virtue of many inventions employed in the construction herein described there has been achieved a subminiature gyro, less than one inch in diameter, less than two inches long and weighing only 2.9 ounces. This constitutes the smallest gyro now known to exist and meets or exceeds the performance characteristics of larger rate gyros. Yet the gyro is capable of lower cost production than other larger available instruments.

For a more detailed description of the present invention, reference may now be made to the following description taken in connection with the accompanying drawing.

In the drawing, Fig. 1 is a perspective side view of a gyroscope embodying the present invention shown in actual size; Fig. 2 is an enlarged, side elevation view, partly in section, of the gyroscope of the present invention; Fig. 3 is an exploded perspective view, partly in section, of the gyro shown in Figs. 1 and 2, and Fig. 4 is a view of one of the torsion bars or supporting elements of the gyro.

Referring now to the drawing, and particularly to Figs. 2 and 3, the gyro of the present invention is shown comprising a housing 1 of generally cylindrical form having attached at one end a cap 2 which may be used for mounting the gyro in a suitable place. For example it may be mounted on an antenna platform even though the platform is of extremely small size. This is not possible with other rate gyros.

Provided in the end cap 2 are adjusting screws 3, and leads 4. An adjusting ring 5 is provided adajcent to the end cap 2 with rivet holes 6 and pick-off adjustment elements 7, as shown more fully in Fig. 3. An adjusting sealer 8 is disposed at the opposite side of ring 5, followed by the pick-off windings 9, in which there is disposed a pick-off stator 10 and rotor 11, as shown.

The gimbal 12 is disposed, in the central portion, as shown in Fig. 2, and comprises the split upper and lower sections 12a and 12b, which are shown in detail in Fig. 3.

The present invention is particularly directed to the torsion bars 13, one of which is shown separately in Fig. 4. They are disposed at opposite ends of the gimbal. These bars are of an integral, elastic metal construction, in the present embodiment, beryllium copper. They comprise a narrow central portion which provides the spring restraint, that is, it is capable of an axial twisting movement. Enlarged end portions are formed integrally with the bars effecting a rigid, secure, and strong support.

Also for this purpose the enlarged end portions are tapered and the supports in the gimbal, the end cap 2, and the hub or mount 27 of the S-spring assembly, presently to be described, are correspondingly tapered. They thereby provide rigidity and strength while permitting the rotative movement of the gimbal about the output axis, caused by the angular velocity of the rotor. The torsion bars also provide a restraining torque which resists their angular movement about the output axis and returns the gimbal and rotor to their normal relative angular position, immediately after the input force to the gyro has been removed. Friction is thus substantially eliminated from the output axis of the gyro.

By virtue of these torsion bars no moving bearings are required for the gimbal suspension and both support and centering of the gimbal are simply and accurately accomplished. The torsion bars are formed of a low hysteresis, high stress endurance limit material. As stated above, they provide a restraining torque which resists the rotary motion of the gimbal about the output axis caused by input angular velocity of the rotor.

The nuts 15 at the top and bottom of the gimbal sections secure the shaft 16 of the rotor 17. The gyro rotor 17 is preferably constructed of a high density material, such as tantalum, to produce the highest angular momentum for its size. Suitable bearing retainers with bearings are disposed at each end of the rotor shaft which provides a symmetrical, balanced, non-cantilever type of rotor support. This feature forms a part of a copending patent application. Caps 18 are provided for the rotor at each end thereof. The two sections of the gimbal are retained by ring 21 and pick-off rotor 11. An annular temperature compensator member 22 in which several balance screws may be secured, one being shown in Fig. 3, is disposed at this end of the housing.

For the purpose of preventing compression or expansion strain on the torsion bars by different rates of expansion of the parts within the gyro, with temperature changes, there is provided an S-spring assembly 24 at one end of the housing. This assembly comprises a pair of S springs 25 disposed on opposite sides of a ring member 26. A hub element 27 has the torsion bar tapered mounting 14, as previously mentioned, and the output axis stop pin 28 and lock 29 are provided as indicated. Within the ring 26 an annular pressure compensator 30 is disposed. An O ring or gasket 31, a housing cap 32, and name plate 33 are secured, in the order named at the S-spring end of the housing.

The special S-spring assembly, above described, permits the movable parts of the assembly to be relatively free for longitudinal movement, while remaining rigidly fixed for transverse and rotational forces. Among its other advantages, this arrangement, as above pointed out, compensates for strains caused by different rates of expansion of the parts within the gyro relative to housing.

Another feature of the present gyro, which is covered in a copending application, is pressure compensation within the housing of the gyro. In the present arrangement the housing or case 1 is completely filled with a suitable fluid such as oil through the plug 34 in plate 33. Under temperature cycling, different rates of expansion of the fluid and the housing occur. The differences in expansion are compensated for by the provision of the annular member 30 which is disposed within the S-spring assembly. This member 30 is of a cellular material containing a gas which is compressible and thus compensates for any relative change in volume occasioned by difference between the expansion of oil with increased temperature and the expansion of the housing with such change. Without such compensation leakage or failure of the gyro would result.

In order to maintain the stability of the instrument over the operating temperature range the fluid in the housing provides a damping movement of the gimbal about the output axis. Also, the gimbal being immersed in the fluid is given a partially buoyant support which has the effect of reducing its sensitivity to linear acceleration and shock.

It will be seen that the pick-off here provided is basically a differential transformer. The mutual inductance between the primary and secondary of this transformer is varied with their relative angular positions. This in turn is effected by the rotation of the output shaft. This movement is thus translated into an electrical signal which is proportional to and phase sensitive or directly responsive to input angular velocity.

The gyro of the present invention, utilizing the improved torsion bar suspension, pick-off and other features described above, has in practice achieved a resolution of better than 1 part in 10,000 over the full output range and linearity of better than 0.1 percent for input angular velocities up to one-half of full scale output, with linearity of better than one percent for input velocities greater than one-half of full scale output.

While it has been hereinbefore described what is, at present considered, a preferred embodiment of the present invention, it will be apparent to those skilled in the art that many and various changes and modifications may be made therein without departing from the spirit of the invention, and it will be understood that all and any such changes and modifications which fall fairly within the scope of this invention as defined in the appended claims are to be considered as a part of the invention.

What is claimed is:

1. A gyroscope comprising a rotor; a gimbal having bearing means for said rotor coincident with its axis of spin; a suspension for said gimbal including a fixed support; and a pair of torsion bars each having an elastic central portion and tapered enlarged end portions secured to said fixed support and said gimbal along a line perpendicular to said axis of spin, supporting said gimbal while permitting its pivotal movement about said perpendicular line without friction.

2. A gyroscope comprising a rotor; a gimbal having bearing means for said rotor coincident with its axis of spin; a suspension for said gimbal including a fixed support; tapered apertures on said gimbal and said support along a line perpendicular to said axis of spin; and a pivot having an elastic central portion and at least one enlarged tapered end portion supported in said tapered apertures, supporting said gimbal while permitting its pivotal movement about said perpendicular line without friction.

3. A gyroscope comprising a rotor; a gimbal having bearing means for said rotor coincident with its axis of spin; a suspension for said gimbal including a pair of supports; tapered apertures on said gimbal and said supports along a line perpendicular to said axis of spin; and a pair of torsion bars at opposite sides of said gimbal having elastic central portions and enlarged tapered ends secured in said tapered apertures; and supporting said gimbal while permitting its pivotal movement about said perpendicular line without friction.

4. A gyroscope comprising a rotor; a gimbal surrounding said rotor having bearing means for said rotor coincident with its axis of spin; a housing surrounding said gimbal including a pair of end supports, one of said supports having limited freedom of movement along a line perpendicular to said axis of spin; a damping, buoyant fluid in said housing surrounding and supporting said gimbal; apertures in said gimbal and said supports along said perpendicular line; and torsion bars having elastic central portions and enlarged ends secured in said apertures, supporting said gimbal while permitting its pivotal movement without friction about said perpendicular line.

5. A gyroscope comprising a rotor; a gimbal having bearing means for said rotor coincident with its axis of spin; a suspension for said gimbal including a fixed support; and a torsion bar of beryllium copper having a relatively narrow central portion and tapered, enlarged end portions secured to said fixed support and said gimbal along a line perpendicular to said axis of spin, supporting said gimbal while permitting its pivotal movement about said perpendicular line without friction.

6. A gyroscope comprising a rotor; a gimbal having bearing means for said rotor coincident with its axis of spin; a suspension for said gimbal including a pair of supports, one of said supports having limited freedom of movement along a line perpendicular to said axis of spin; apertures in said gimbal and said supports along said perpendicular line; and metallic torsion bars having relatively narrow elastic central portions and enlarged ends secured in said apertures, supporting said gimbal while permitting its pivotal movement about said perpendicular line without friction.

7. A gyroscope comprising a rotor; a gimbal having bearing means for said rotor coincident with its axis of spin; a suspension for said gimbal including a fixed support; apertures in said gimbal and said support along a line perpendicular to said axis of spin; torsion bars having relatively narrow central portions and enlarged ends supported in said apertures supporting said gimbal while permitting its pivotal movement about said perpendicular line; and a pair of pick-off elements, one secured to said fixed support and the other to said gimbal for movement therewith to translate the angular velocity of the rotor into an output signal proportional thereto.

8. A gyroscope comprising a rotor; a gimbal having bearing means for said rotor coincident with its axis of spin; a suspension for said gimbal including a fixed support; apertures in said gimbal and said support along a line perpendicular to said axis of spin; torsion bars having relatively narrow central portions and enlarged ends supported in said apertures supporting said gimbal without friction while permitting its pivotal movement about said perpendicular line; and a differential transformer having one section thereof secured to said fixed support and another section secured to said gimbal for movement therewith to translate its angular velocity into an electrical signal having an amplitude proportional to angular velocity of said rotor.

9. An inertial guidance-type instrument, comprising: a mass-member pivotable about an axis; a suspension for said mass-member including a fixed support; and a pair of torsion bars, each having an elastic central portion and tapered, enlarged end portions, secured to said fixed support and said mass-member along said axis for supporting said mass-member while permitting its pivotal movement about said axis without friction.

10. An inertial guidance-type instrument, comprising: a mass-member pivotable about an axis; a suspension for said mass-member including a fixed support; tapered apertures on said mass-member and said support along said axis of pivot; and a pivot, having an elastic central portion and at least one enlarged tapered end portion, supported in said tapered apertures for supporting said mass-member while permitting its pivotable motion about said axis without friction.

References Cited in the file of this patent

UNITED STATES PATENTS

| | | |
|---|---|---|
| 2,138,531 | Wise et al. | Nov. 29, 1938 |
| 2,409,178 | Allison et al. | Oct. 15, 1946 |
| 2,414,102 | Hull et al. | Jan. 14, 1947 |
| 2,537,844 | Meredith | Jan. 9, 1951 |
| 2,606,447 | Boltinghouse | Aug. 12, 1952 |
| 2,650,502 | Lundberg et al. | Sept. 1, 1953 |
| 2,672,054 | Warren et al. | Mar. 16, 1954 |
| 2,687,647 | Ashworth et al. | Aug. 31, 1954 |
| 2,703,935 | Mead et al. | Mar. 15, 1955 |
| 2,800,024 | Lear et al. | July 23, 1957 |

FOREIGN PATENTS

| | | |
|---|---|---|
| 573,061 | Great Britain | Nov. 5, 1945 |